(12) United States Patent
O'Hagan

(10) Patent No.: US 10,803,369 B2
(45) Date of Patent: *Oct. 13, 2020

(54) METHOD, SYSTEM AND APPARATUS FOR DIMENSIONING ITEMS

(71) Applicant: ZEBRA TECHNOLOGIES CORPORATION, Lincolnshire, IL (US)

(72) Inventor: James J. O'Hagan, McHenry, IL (US)

(73) Assignee: Zebra Technologies Corporation, Lincolnshire, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/557,660

(22) Filed: Aug. 30, 2019

(65) Prior Publication Data

US 2020/0184292 A1 Jun. 11, 2020

Related U.S. Application Data

(63) Continuation of application No. 16/216,730, filed on Dec. 11, 2018, now Pat. No. 10,438,100.

(51) Int. Cl.
*G06K 19/00* (2006.01)
*G06K 19/04* (2006.01)
*G06K 19/06* (2006.01)

(52) U.S. Cl.
CPC ..... *G06K 19/045* (2013.01); *G06K 19/06056* (2013.01); *G06K 19/06075* (2013.01)

(58) Field of Classification Search
CPC .......... G06K 19/045; G06K 19/06056; G06K 19/06075

USPC .......................................... 235/454; 700/214
See application file for complete search history.

(56) References Cited

U.S. PATENT DOCUMENTS 8,086,344 B1 * 12/2011 Mishra ............... G06Q 30/0283
700/214
10,438,100 B1 * 10/2019 O'Hagan ......... G06K 19/06056

FOREIGN PATENT DOCUMENTS

JP 06019925 A * 1/1994

* cited by examiner

*Primary Examiner* — Daniel A Hess
(74) *Attorney, Agent, or Firm* — Yuri Astvatsaturov

(57) ABSTRACT

A method of generating dimensioning assist information for an item includes: obtaining data associated with a physical size of a graphical dimensioning aid associated with the item; generating dimensioning assist information by encoding the data into a machine-readable data object carried by the item. A method of dimensioning an item includes, at a dimensioning system: capturing an image of the item and the graphical dimensioning aid carried by the item; detecting an edge of the item within the captured image; determining a measurement of the edge; detecting the graphical dimensioning aid within the captured image; determining a measurement of the graphical dimensioning aid; decoding a physical size of the graphical dimensioning aid from a machine-readable data object carried by the item; and dimensioning the edge based on the measurement of the edge, the measurement of the graphical dimensioning aid, and the physical size.

20 Claims, 10 Drawing Sheets

US 10,803,369 B2

METHOD, SYSTEM AND APPARATUS FOR DIMENSIONING ITEMS

CROSS-REFERENCE TO RELATED APPLICATION

This application is a continuation of U.S. patent application Ser. No. 16/216,730, filed on Dec. 11, 2018, and incorporated herein by reference in its entirety.

BACKGROUND

The transportation and storage of items such as packages may require knowledge of the dimensions of a package. Such information may be employed to optimize the use of available space in a container (e.g. a trailer), to determine a shipping or storage cost for the package, or the like. Package dimensions, however, may not be known in advance, and workers may therefore be required to obtain package dimensions by manually measuring the packages. Taking manual measurements can be time-consuming and error-prone. Attempts to determine package dimensions from image data may require that the position and orientation of the image sensor relative to the package be known. Such positional data may not be available, particularly when mobile devices are used for dimensioning, when packages are in motion and the like.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
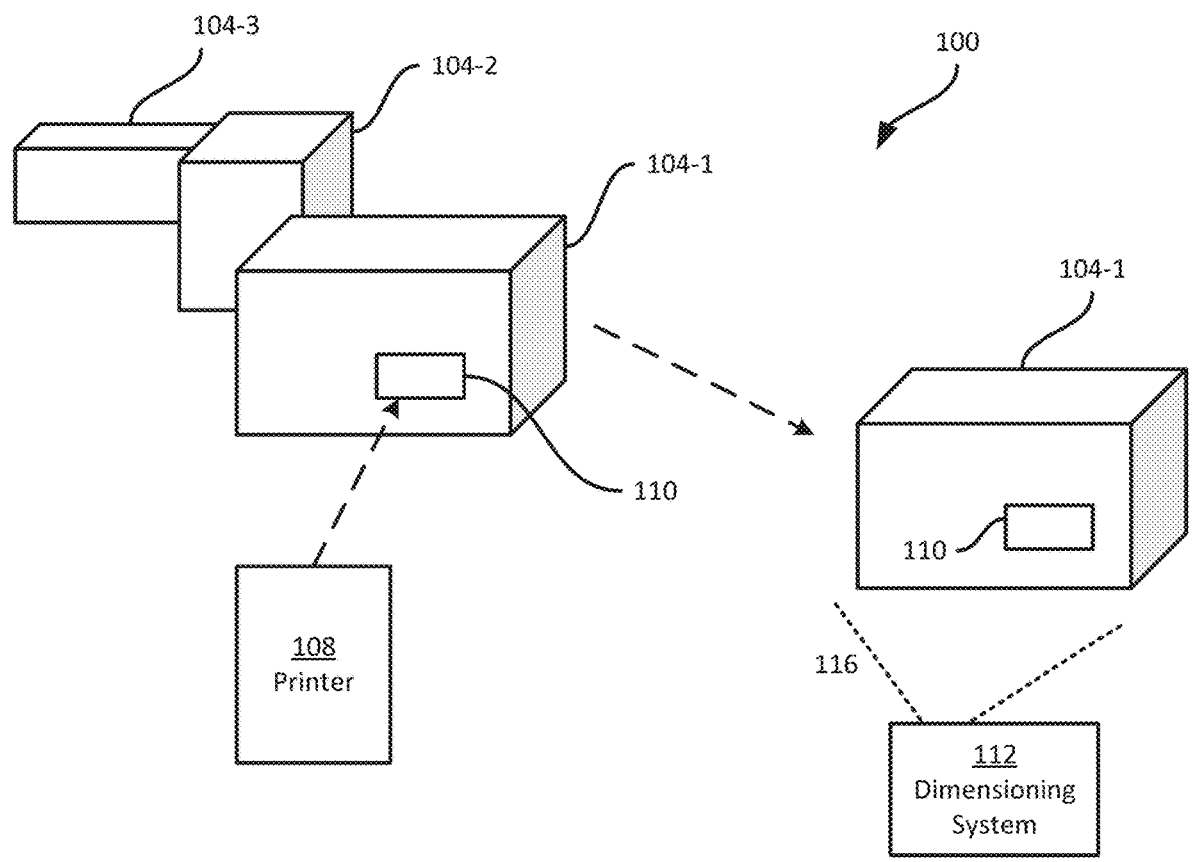
FIG. 1 is a schematic of a system for processing items.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of generating dimensioning assist information for an item, the method comprising: obtaining data associated with a physical size of a graphical dimensioning aid associated with the item; generating dimensioning assist information by encoding the data into a machine-readable data object carried by the item.

Additional examples disclosed herein are directed to a method of dimensioning an item, comprising: at a dimensioning system, capturing an image of the item and a graphical dimensioning aid carried by the item; detecting an edge of the item within the captured image; determining a measurement of the edge; detecting the graphical dimensioning aid within the captured image; determining a measurement of the graphical dimensioning aid; decoding a physical size of the graphical dimensioning aid from a machine-readable data object carried by the item; dimensioning the edge based on the measurement of the edge, the measurement of the graphical dimensioning aid, and the physical size.

Further examples disclosed herein are directed to dimensioning media comprising: a printable substrate carrying a machine-readable data object; a graphical dimensioning aid printed on the substrate; wherein a physical size of the graphical dimensioning aid is encoded in the machine-readable data object.

FIG. 1 depicts a system 100 for processing items, such as packages 104, of which three examples 104-1, 104-2 and 104-3 are shown (referred to collectively as the packages 104, and generically as a package 104). The packages 104 may be, for example, handled by one or more transport and logistics systems for transport between destinations. Transportation of the packages 104 may include placement of the packages 104 within one or more containers for shipment, such as a shipping container, the trailer of a transport truck, the freight compartment of a delivery vehicle, or the like. The packages 104 are shown as rectangular prisms of varying shapes, but it is contemplated that the packages 104 can also have a wide variety of other shapes, e.g. cylinders, triangular prisms, truncated pyramids, suitcases, bags, shrink-wrapped bulk packages, pails, barrels, and other shapes, or could comprise flexible packaging.

Handling and transportation of the packages 104 may require that the dimensions of the packages 104 be determined and recorded. For example, the dimensions of each package 104 may be determined according to a suitable standard, such as the GDSN Package Measurement Rules Standard, the contents of which is incorporated herein by reference. The dimensions of each package 104 may include dimensions defining both the size (e.g. height, width and depth), as well as the weight of the packages 104. In the discussion below, however, references to a package dimension of a package 104 refer to a dimension defining a size of the package 104, rather than the weight of a package 104. Package dimensions may be employed for loading containers with packages 104, for example to efficiently utilize the space within a container. Package dimensions may be employed for determining freight charges for transporting or storing packages 104.

Certain packages 104 may be comprised of a manufactured item enclosed in a carton of known dimensions. Certain packages 104 may be comprised of one or more selected items kitted in a carton of known dimensions. Such packages have package dimensions predetermined before the package is received at a transport and logistics system. However, the package dimensions of other packages 104 may not be known prior to the handling of such packages 104 to determine freight charges, to load a container, or to conduct other handling procedures. Further, predetermined package dimensions, even if known to some entities, such as the manufacturer of a box or packager of an item, may not be readily available to other entities, such as an operator responsible for loading a container, determining an amount to charge for shipping the package 104, and the like. Still further, certain packages 104 may not maintain predetermined package dimensions once loaded (e.g. the walls of a package may deform such that the predetermined dimensions are no longer accurate, or an open bin may be loaded above the top of the container).

Figure 1A:
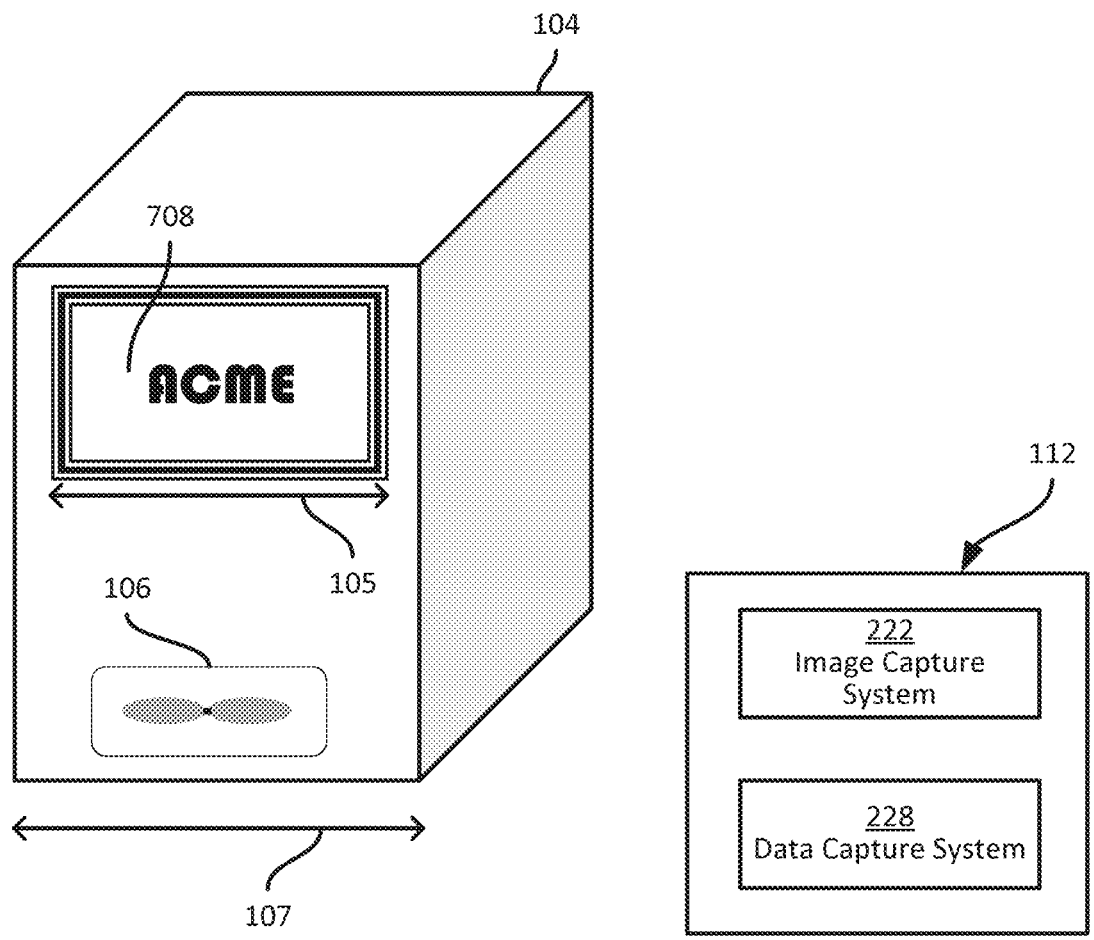
FIG. 1A is a schematic of another system for processing items.

FIG. 1A depicts a system for processing items, such as a package 104. The system of FIG. 1A enables the determination of dimensioning assist information for an item such as the package 104. The item 104 carries a visual design such as a logo, trademarked symbol, geometric shape, or other graphic or predetermined symbol 708 and a machine-readable data object (MRDO) such as an RFID device 106. The visual design may be used as a source identifying symbol; it may comprise several graphical elements such as text characters, spacing, and geometric shapes; it may be marked in one or more colors. The graphic 708 may be marked directly on a manufactured good, it may be marked on the carton or other packaging for the good, it may be marked on a label affixed to the item, or may be otherwise associated with the item. The MRDO, a data carrier such as an RFID tag device 106, may be incorporated within a manufactured good, may be incorporated into the packaging, may be incorporated into a label affixed to the item, or may be otherwise associated with the item. In an embodiment, the RFID device 106 is a RFID inlay comprising a flexible substrate carrying an antenna, a RFID chip comprising memory that may carry data, and adhesive allowing the inlay to be affixed to the packaging or incorporated into a smart-label that may be affixed to the packaging or a good. When interrogated by a signal from an RFID interrogator, the antenna receives the signal, providing sufficient power to both activate the RFID chip and to backscatter a response signal to the RFID interrogator. Thus, the RFID interrogator and the RFID chip of the MRDO 106 may exchange data. The RFID interrogator may write or encode data to the memory of the RFID chip; the RFID interrogator may read data from the memory by decoding the backscattered response. In an embodiment, the graphic 708 may indicate the source of the item, the presence of an RFID tag, shipping information, or may be purely cosmetic. In an embodiment, the data encoded in the MRDO 106 is a physical size 108 of the graphic 708, such as 50 mm. Such a graphic 708 may be referred to as a graphical dimensioning aid (GDA) because the graphic 708 is associated with an item 104 that carries an MRDO 106 encoding a physical size 105 of the graphic 708. The MRDO 106 and GDA 708 may be used by a dimensioning system 112 to dimension the package 104 as explained in detail below. Using an image capture system 222, the dimensioning system may capture one or more images from the field of view 116 of the package 104 and the GDA 708 which it may analyze to estimate the size of the package relative to the GDA.

The package 104 and the GDA 708 may appear large in an image captured near the package, but the same package may appear small in an image captured far from the package. Similarly, a lens arrangement of the image capture system 222 may provide adjustable zoom causing a captured image of the package 104 and the GDA 708 to appear large at one lens setting but to appear small at a second lens setting. In many embodiments however, the relationship between the apparent size of the package 104 and the apparent size of the GDA 708 is nearly constant when the GDA 708 is positioned near a plane of the item 104, such as on the side of a package box. Using a data capture system 228 such as an RFID reader, the dimensioning system may decode from the MRDO 106 the physical size of the GDA 708. Because the relative size of the item 104 to the GDA 708 may be determined from the captured image, and the true physical size 105 of the GDA 708 may be determined from the captured data, the true physical dimension 107 of the item may be determined by scaling the physical size 105 of the GDA by the relative size.

Various types of machine-readable data objects may be used to encode the physical size 105 of the GDA in certain embodiments, including RFID devices and/or visible marks. A passive RFID tag or inlay such as a Gen2 tag may encode the physical size of the GDA. A chipless RFID tag may encode the physical size. A near field communication (NFC) tag, semi-passive RFID tag, or active RFID tag could encode the physical size. A barcode, such as a linear barcode, two dimensional barcode, stacked symbology, color barcode, matrix barcode, or combination barcode may encode the physical size of the GDA. Text, colors, or symbols may encode the physical size. In an embodiment, the text Pallet may encode a 1 inch physical size of a GDA while the text Case may encode a 1 pica physical size of a GDA. In an embodiment, the packaging indicator of a GTIN may encode a physical size of the GDA. In an embodiment, a compliance label format may encode a physical size of the GDA as explained below.

In certain embodiments, various types of graphics may be used as the Graphical Dimensioning Aid 708 for which a physical size 105 is encoded into the MRDO 106. The graphic may be created by the contrast between a label of one color, such as black, and the color, such as white, of the packaging to which it is affixed. Or a border color, such as red or black, may be used on a label to aid in differentiating the border of a label from the packaging in the captured image. The graphical dimensioning aid may comprise a plurality of graphical elements, such as alphanumeric text glyphs, barcode combinations, various color regions, pictures, or geometric shapes. The GDA may comprise a physical feature, such as a box handle or the antenna of an RFID device.

In certain embodiments, a printer 108 may mark at least a portion of the GDA and/or the MRDO on an item or on dimensioning media associated with the item. In an embodiment, marking the item or dimensioning media is done using printer technology such as hot stamping, dot peening, laser marking, chemical deposition, chemical etching, offset lithography, engraving, stencil duplicating, letterpress, screen printing, flexography, or gravure printing. These printer technologies generally involve creating a pattern which is used to mark each of a plurality of items or dimensioning media with a graphic. In an embodiment, a printer marks a substrate with a printed antenna, and a chip and adhesive are added to the substrate to create an RFID inlay device. In an embodiment, sometimes referred to as digital printing, a printer receives or creates a printable representation of a graphic that it may store or process as a bitmap. Digital printing generally involves marking the printable representation defined by a bitmap to one or more items or dimensioning media. In an embodiment, a digital printer may create a bitmap, mark the bitmap to a single label, then create a second bitmap and mark the second bitmap to a second label. Thus, digital printing facilitates printing a high volume of unique dimensioning media at rapid speed. Various digital printing technologies are within the scope of this invention, including impact, thermal, continuous inkjet, drop-on demand inkjet, direct laser, solid ink, laser printing, liquid toner, and laser marking.

In certain embodiments, dimensioning media may carry graphics or machine-readable data objects associated with an item. In a preferred embodiment, dimensioning media is comprised of a printable substrate, such as paper, polyester, cardboard, plastic film or sheets, woven fabrics and the like which may be coated with one or more adhesives and/or coatings to facilitate printing, scratch resistance, durability, radio frequency performance, strength, chemical tolerance, and such. In an embodiment, a printable substrate is coated with a thermochromic dye, layered with an adhesive and a silicone coated liner, die-cut into individual labels, then wound onto a core to create a roll of direct thermal labels. In an embodiment, a printable substrate is layered with an adhesive and a silicone coated liner, die-cut into individual labels, then wound onto a core to create a roll of thermal transfer labels that may be printed with a thermal transfer printer using a thermal transfer ribbon. In certain embodiments, a label of one color may be affixed to an item or package of a contrasting different color creating a visible graphic that may be detected by a dimensioning system, or a border may be printed on the label to create a contrast between the label and the item. In an embodiment, a RFID inlay device is affixed to a direct thermal or thermal transfer label to create a printable smartlabel. In an embodiment, a RFID inlay device may be incorporated into media such as a cardboard carton, a graphic printed to the media, and a physical size of the graphic encoded into the RFID device to generate dimensioning media.

In certain embodiments, a visual feature of the MRDO may be used as the GDA. An RFID device may encode the physical size, e.g. a length of an antenna of the RFID device; the image capture system 222 would capture the appearance of the antenna while data capture system 228 would capture the physical size of the antenna. A barcode may encode the physical size, e.g. a height and/or width, of the barcode; the image capture system 222 would capture the appearance of the barcode while data capture system 228 would decode the physical size of the barcode. Text may encode the physical size of the text; the image capture system 222 would capture an image of the text while data capture system 228 would decode the physical size of the text, using a method such as optical character recognition (OCR) or pattern recognition. In some embodiments, the data capture system 228 would use a captured image from the image capture system 222 to decode and capture the physical size from the MRDO 106. In an embodiment, a compliance label formatted according to a compliance standard for pallet shipping may carry a GDA with a first physical size defined by the compliance standard while a compliance label formatted according to a compliance standard for case packaging may carry a GDA with a second defined physical size; the image capture system 222 would capture the appearance of the compliance label, the data capture system 228 would analyze the captured image to identify the compliance format of the compliance label from a database of predefined formats to decode the physical size of the GDA. Thus, the dimensioning system 112 is able to capture, from an item, an image of the item and an associated GDA and a physical size of the GDA encoded in a machine-readable data object carried by the item.

Figure 9:
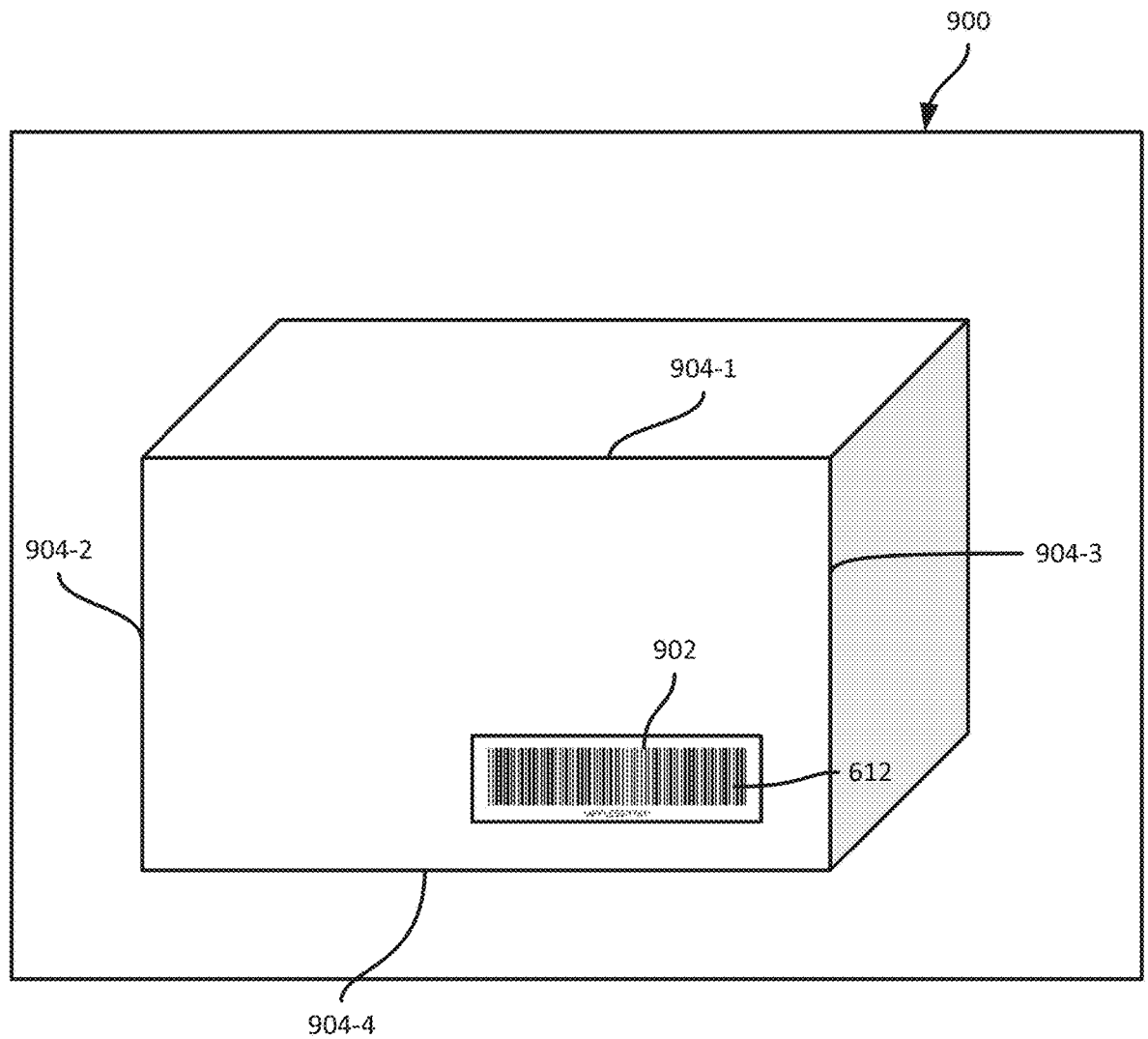
FIG. 9 illustrates an image captured via performance of the method of FIG. 8.

Returning to FIG. 1, the system 100 enables the application of dimensioning assist information to a package 104 for use in determining the package dimensions of the package 104 from an image (e.g. a captured image 900 of the package 104, discussed in greater detail in connection with FIG. 9).

In an embodiment, the system 100 includes a printer 108 configured to generate a dimensioning media, e.g. a label comprising dimensioning assist information. The printer 108, in the present example, is a label printer, configured to generate graphics and other indicia, which can include the dimensioning assist information, on label media. For example, the printer 108 can be configured to store a supply of label media (e.g. a roll supporting a web of liner carrying a plurality of labels, a stack of fan-fold labels, a supply of printable smartlabels with RFID inlays, a roll of linerless labels and the like), and to control a print assembly to mark the labels with graphics and/or other indicia, such as text, barcodes, numerals, logos, photographs, and the like.

Various mechanisms by which the above-mentioned mark is printed are contemplated. For example, the print assembly of the printer 108 can include a thermal printhead having an array of heating elements each controllable to heat an adjacent portion of a label coated with a thermochromic dye or the like above a transition temperature, at which the label portion changes color (e.g. from light to dark). The printhead is therefore controlled to mark successive rows of dots on the label, corresponding to pixels in a raster bitmap employed to control the printhead. The heating elements of the printhead are disposed at a spacing that defines the maximum resolution of the printer 108. For example, a printhead having an array of about eight heating elements per millimeter can print at a resolution of about 200 dots per inch (dpi) (specifically, 203 dpi). For such a printhead, a bitmap with a width of twenty-four pixels would have a physical size of about 3 millimeters when printed.

As will be discussed below in greater detail, the printer 108 can be configured to apply dimensioning assist information to the package 104 using mechanisms other than marking, or using combinations of such other mechanisms with marks or printed labels. For example, the printer 108 can include a radio frequency identification (RFID) encoder configured to encode data to an RFID device affixed to the package 104, or embedded in the above-mentioned label media. Such an embodiment may be referred to as a printer-encoder. The above-mentioned supply of label media may include a roll of labels containing RFID inlay devices, and the printer 108 may be configured to both mark the labels and to encode data to the RFID inlays. The dimensioning assist information can therefore be embodied in one or both of marks applied to one or more labels, an example 110 of which is illustrated in FIG. 1, and data encoded to an RFID device, such as an inlay of the label 110.

The dimensioning assist information mentioned above includes a graphical dimensioning aid (GDA) and a machine-readable data object including at least one physical size of the graphical dimensioning aid. The graphical dimensioning aid may be printed on a label, a sticker, a carton, a tag, an RFID inlay or other printable substrate. Once the graphical dimensioning aid is printed it has a physical size comprising a GDA height and length, although the printed mark has a negligible thickness. A physical size of the graphical dimensioning aid (e.g. the GDA height, length, or a combination of the two) may be determined by the printer 108 for encoding in the machine-readable data object as will be discussed in greater detail below. The printed label is affixed to and becomes part of the package 104. The package 104 is therefore marked with the graphical dimensioning aid and encoded with data defining a physical size of the graphic as it appears on the package 104.

The dimensioning assist information applied to a package 104 (that is, the graphical dimensioning aid and the machine-readable data object) are employed by a dimensioning system 112, for example following the transportation of the package 104-1 to another destination as shown in FIG. 1, to determine one of more physical dimensions of the package 104-1. The dimensioning system 112 can be implemented as a plurality of devices, such as a plurality of cameras, lidar sensors, or the like coupled to a central controller. In other examples, the dimensioning system 112 is a single integrated unit, such as a mobile computer including one or more cameras. The dimension system 112 or components thereof may be carried by a person, moved on a cart or robot, mounted within a venue near a conveyor or dock, or similarly positioned in proximity to an item to be dimensioned.

The dimensioning system 112 is configured to capture an image 900 of the package 104-1 (e.g. within a field of view 116 shown in FIG. 1), in which the graphical dimensioning aid can be detected, and also to decode the physical size encoded in the above-mentioned machine-readable data object. With the graphic and the physical size (which defines at least one printed size of the graphic), the dimensioning system 112 is enabled to determine package dimensions of the package 104-1. As will be apparent in the discussion below, comparing the relative size of an edge of the package to the graphical dimensioning aid, as depicted in the captured image, combined with the decoded physical size of the graphical dimensioning aid, can yield the physical dimension of the edge. Similarly, comparing the relative size of a second edge of the package to either the first edge or the GDA can yield the physical dimension of the second edge.

Figure 2A:
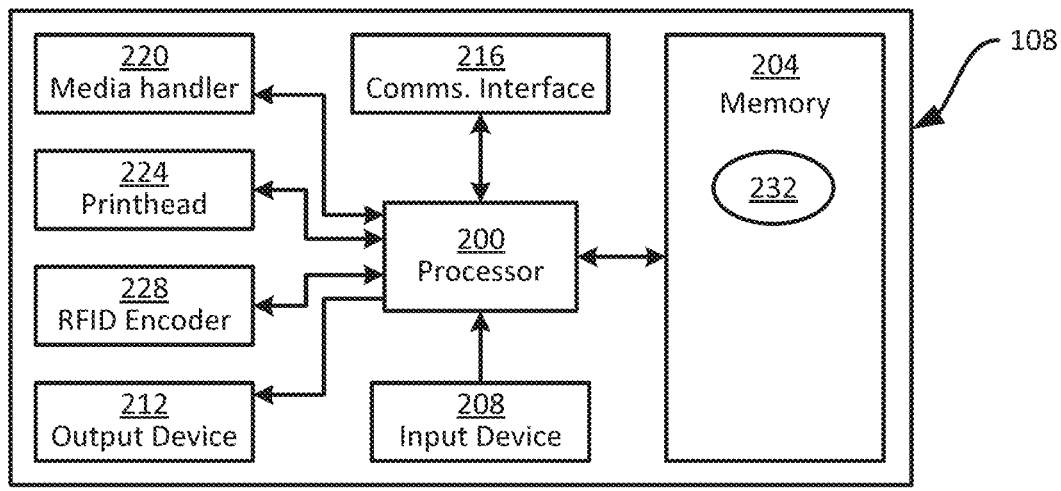
FIGS. 2A and 2B are block diagrams of certain internal hardware components of the printer of FIG. 1 and the dimensioning system of FIG. 1, respectively.
Figure 2B:
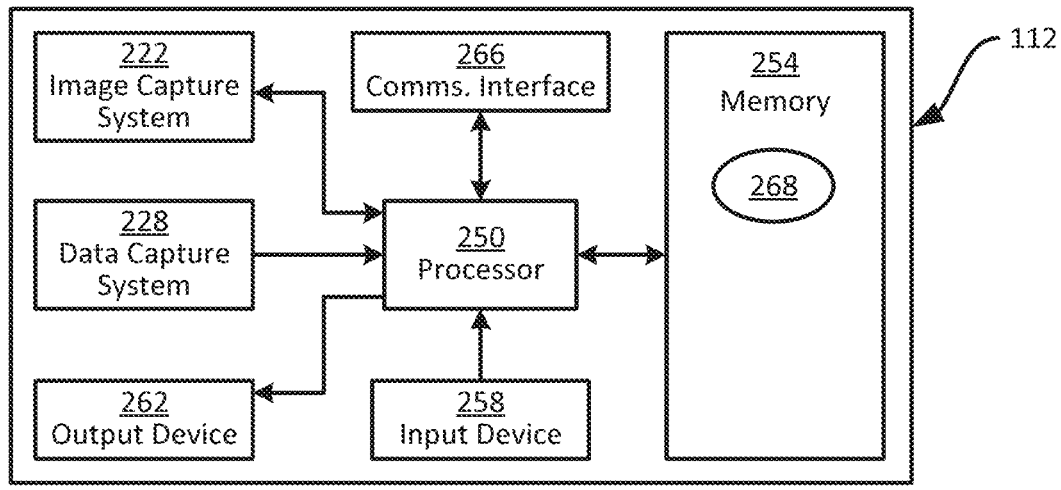

Turning to FIGS. 2A and 2B, before discussing the functionality implemented by the printer 108 and the dimensioning system 112, certain internal components of the printer 108 and the dimensioning system 112 are illustrated.

As shown in FIG. 2A, the printer 108 includes a central processing unit (CPU), also referred to as a processor 200, interconnected with a non-transitory computer readable storage medium, such as a memory 204. The memory 204 includes a suitable combination of volatile memory (e.g. Random Access Memory ("RAM")) and non-volatile memory (e.g. read only memory ("ROM"), Electrically Erasable Programmable Read Only Memory ("EEPROM"), flash memory). In general, the processor 200 and the memory 204 each comprise one or more integrated circuits.

The printer 108 may also include at least one input device 208 interconnected with the processor 200. As will be apparent to those skilled in the art, the input device 208 is configured to receive input and provide data representative of the received input to the processor 200. The input device 208 includes any one of, or a suitable combination of, a touch screen, a keypad, a button, a switch, a membrane switch, a sensor, a microphone, and the like. In an embodiment, the input device 208 is a sensor to detect a package moving along a conveyor approaching a printer, a label applicator, or a printer-applicator. The printer 108 may include at least one output device 212 interconnected with the processor 200. The output device 212, in the present example, includes a display (e.g. a flat-panel display aligned with the above-mentioned keypad). The output device 212 can also include, in addition to or instead of the above-mentioned display, any one of, or a suitable combination of, a speaker, a notification LED, and the like.

The printer 108 also includes a communications interface 216 interconnected with the processor 200. The communications interface 216 includes suitable hardware (e.g. transmitters, receivers, connectors, network interface controllers and the like) allowing the printer 108 to communicate with other computing devices, for example via a cable, a print server, a radio (e.g. a WiFi card, Bluetooth radio or NFC radio), or a network (e.g. a local-area network (LAN), such as a wireless LAN, a wide-area network such as the Internet, or a combination thereof). The specific components of the communications interface 216 are selected based on the type of network or other links that the printer 108 is required to communicate over.

The printer 108 also includes components configured for generating dimensioning media. The printer 108 may include a media handler assembly 220, which may include a storage compartment, roll or the like holding the above-mentioned supply of label media. The media handler 220 can also include one or more motors, gear trains, belts, rollers, guide structures, sensors and the like for feeding label media from the supply to one or more printing and/or encoding components along a media feed path. In the present example, the printing and/or encoding components include a printhead 224 and an RFID encoder 228. The printhead 224 may be a thermal printhead including, for example, the above-mentioned row of heating elements that are selectively enabled (i.e. heated) or disabled as the label media traverses the printhead 224, to apply a sequence of rows of pixels from a bitmap rendered by the processor 200 for printing to the label media. The RFID encoder 228 includes a suitable combination of antennas or couplers and associated control hardware for reading data from, and writing data to, RFID devices such as RFID inlays embedded in the above-mentioned label media. The RFID encoder 228 is configured to receive data for encoding to the RFID device from the processor 200, and to write the data to an RFID device upon arrival of the RFID device adjacent to the RFID encoder 228 (e.g. via movement of the label media by the media handler 220). In other embodiments, the RFID encoder 228 can be omitted.

The memory 204 of the printer 108 stores one or more applications, each including a plurality of computer readable instructions executable by the processor 200. The execution of the above-mentioned instructions by the processor 200 causes the printer 108 to implement certain functionality, as discussed herein. The applications are therefore said to be configured to perform the functionality in the discussion below. In the present example, the memory 204 of the printer 108 stores media generation application 232, also referred to herein as the application 232. The printer 108 is configured, via execution of the application 232 by the processor 200, to generate dimensioning media bearing the graphical dimensioning aid and the machine-readable data object including the physical size as mentioned earlier, for application to a package 104. In some embodiments, the application may also render additional other indicia, such as text, barcodes, numerals, logos, photographs, and the like or generate additional instructions for the RFID Encoder 228.

Data, such as an item identifier or physical size for a GDA, may be encoded for dimensioning media by the application 232 in a variety of ways. For instance, characters representing data may be rendered as text glyphs for printing, saved in memory of an RFID device, used as field data in an algorithm for rendering a barcode, mapped to one of a plurality of colors or geometric symbols. In some embodiments, first data may be combined with second data before encoding or during encoding, or first data may be encoded before second data is encoded. Data may be encrypted before encoding, or may be encrypted as a result of being combined with second data or as a result of the encoding process itself. Combinations of such encoding may also be used in some embodiments. In some examples, the processor 200, as configured by the execution of the application 232, is implemented as one or more specifically-configured hardware elements, such as field-programmable gate arrays (FPGAs) and/or application-specific integrated circuits (ASICs). In some examples, the processor 200 is implemented as a processor within a housing of a printer combined with a processor outside the housing of the printer communicating via the communications interface 216.

Turning to FIG. 2B, the dimensioning system 112 includes a central processing unit (CPU), also referred to as a dimensioning processor 250, interconnected with a non-transitory computer readable storage medium, such as a memory 254. The memory 254 includes a suitable combination of volatile memory (e.g. Random Access Memory ("RAM")) and non-volatile memory (e.g. read only memory ("ROM"), Electrically Erasable Programmable Read Only Memory ("EEPROM"), flash memory). In general, the dimensioning processor 250 and the memory 254 each comprise one or more integrated circuits.

The dimensioning system 112 also includes at least one input device 258 interconnected with the dimensioning processor 250. As will be apparent to those skilled in the art, the input device 258 is configured to receive input and provide data representative of the received input to the dimensioning processor 250. The input device 258 includes any one of, or a suitable combination of, a touch screen, a keypad, a trigger button, a sensor, a microphone, and the like. In an embodiment, the input device is a sensor to detect a package within a field of view of the image capture system 222. In an embodiment, the input device is a sensor to detect a package within a field of view of the data capture system 228. The dimensioning system 112 also includes at least one output device 262 interconnected with the dimensioning processor 250. The output device 262, in the present example, includes a display (e.g. a flat-panel display integrated with the above-mentioned touch screen). The output device 262 can also include, in addition to or instead of the above-mentioned display, any one of, or a suitable combination of, a speaker, a notification LED, and the like.

The dimensioning system 112 also includes a communications interface 266 interconnected with the dimensioning processor 250. The communications interface 266 includes suitable hardware (e.g. transmitters, receivers, network interface controllers and the like) allowing the dimensioning system 112 to communicate with other computing devices, for example via a network (e.g. a local-area network (LAN), such as a wireless LAN, a wide-area network such as the Internet, or a combination thereof). The specific components of the communications interface 266 are selected based on the type of network or other links that the dimensioning device 112 is required to communicate over.

The dimensioning system 112 further includes one or more components configured to collect data from a package 104 (and specifically from the dimensioning media previously applied to the package 104) for use by the dimensioning system 112 in determining package dimensions of the package 104. In the present example, the above-mentioned components include an image capture system 222 (e.g. a camera or imaging array) configured to capture an image of the field of view 116 shown in FIG. 1. The captured image can be stored in the memory 254 as a color (e.g. RGB, CMYK, black/white) image or a grayscale image. The dimensioning system 112 and/or the image capture system 222 may include an illumination system configured to illuminate at least a portion of the field of view 116 to improve the quality of the captured image. For instance, the illumination system may use infrared light, ultraviolet light, and/or colored light of various durations or intensity to facilitate capturing the image. In the present example, the dimensioning system 112 also includes a machine-readable data capture system 228 configured to capture physical size data from a machine-readable data object associated with the item, such as a RFID reader configured to retrieve data from a RFID inlay in dimensioning media applied to the package 104. The RFID reader 228 thus includes a suitable combination of antennas and associated control hardware for emitting an interrogation signal and detecting a backscattered signal from the RFID device containing data encoded in the RFID device. In some embodiments, the dimensioning system 112 can also include an alternate machine-readable data capture module such as a barcode scanner including an emitter of a beam of laser light and a sensor configured to detect reflected portions of the beam indicative of a barcode on the package 104. In the present example, barcode detection and decoding is instead performed employing images captured with the image capture system 222; and the alternate data capture module is therefore omitted. In other embodiments the dimensioning system 112 can use optical character recognition (OCR) to decode data from the dimensioning media and may use either images captured by the image capture system 222 or an alternate data capture module to capture said data.

The memory 254 of the dimensioning system 112 stores a plurality of applications, each including a plurality of computer readable instructions executable by the dimensioning processor 250. The execution of the above-mentioned instructions by the dimensioning processor 250 causes the dimensioning system 112 to implement certain functionality, as discussed herein. The applications are therefore said to be configured to perform the functionality in the discussion below. In the present example, the memory 254 of the dimensioning system 112 stores dimensioning application 268, also referred to herein as the application 268. The dimensioning device 112 is configured, via execution of the application 268 by the dimensioning processor 250, to capture an image depicting the package 104 (and therefore the graphical dimensioning aid previously applied to the package 104) and to retrieve the physical size from the machine-readable data object. The dimensioning system 112 is then configured to determine one or more physical package dimensions of the package 104 from the image and the physical size.

In other examples, the dimensioning processor 250, as configured by the execution of the application 268, is implemented as one or more specifically-configured hardware elements, such as field-programmable gate arrays (FPGAs) and/or application-specific integrated circuits (ASICs). In some examples, the dimensioning processor 250 is implemented as a processor within a housing of a dimensioning system combined with a processor outside the housing of the dimensioning system communicating via the communications interface 266.

The printer 108 and the dimensioning system 112 can be configured to perform tasks other than those noted above (e.g. the generation of dimensioning media for application to the packages 104 and the dimensioning of the packages 104 based on the dimensioning media). For example, the printer 108 and the device 112 can generate and/or collect other data related to identifying, transporting and handling of the packages 104, and receive and/or transmit such data to or from other computing devices. Such functionality is not discussed in detail below, however.

Figure 3:
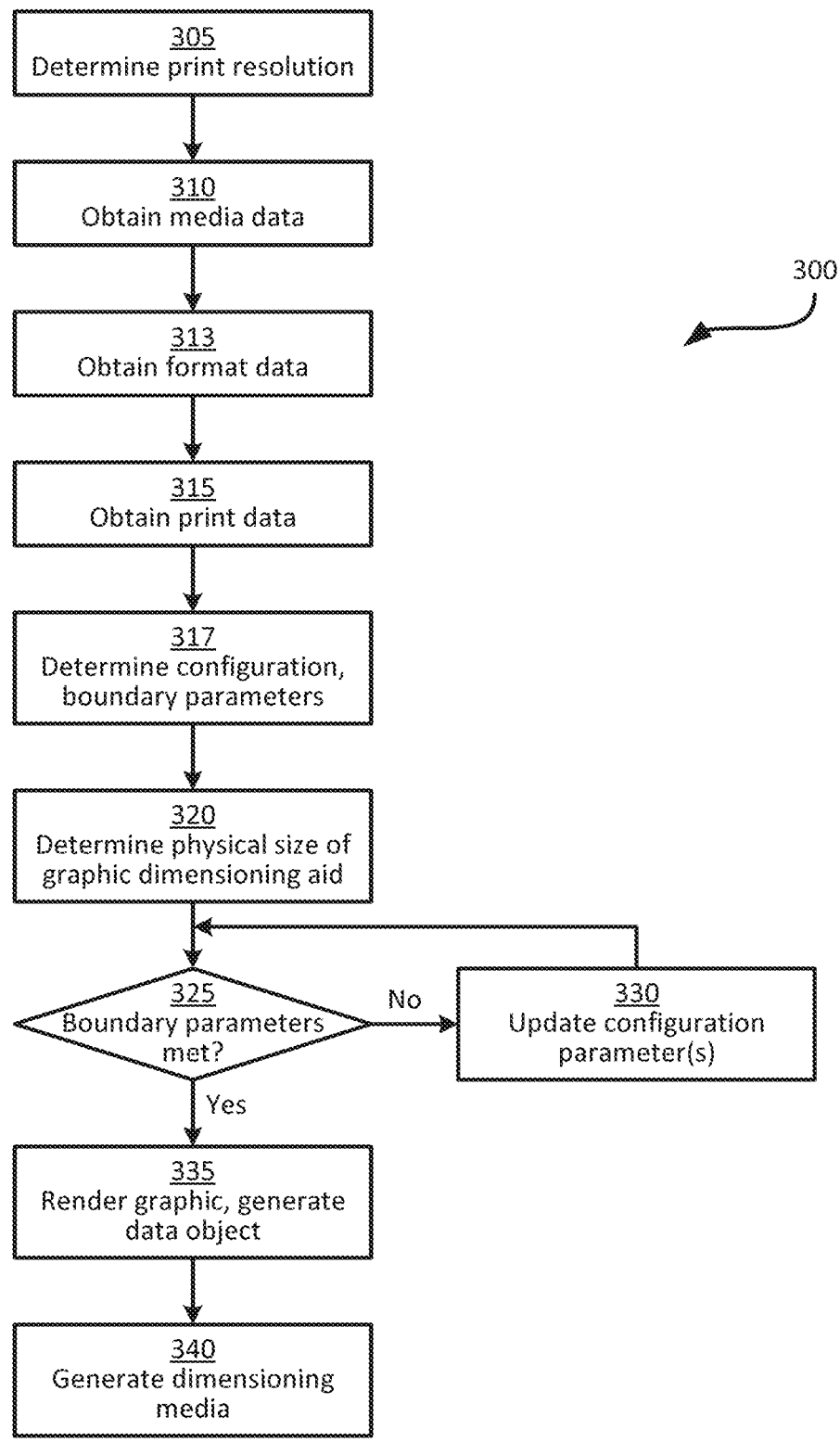
FIG. 3 is a flowchart of a method for generating dimensioning media.

The functionality of the printer 108, as implemented via execution of the application 232 by the processor 200, will now be described in greater detail with reference to FIG. 3. FIG. 3 illustrates a method 300 of generating dimensioning media for application to a package 104. The method 300 will be described in conjunction with its performance in the system 100, and specifically by the printer 108.

At block 305, the printer 108 is configured to determine a print resolution of the printhead 224. In the present example, in which the printhead 224 is a thermal printhead including a linear array of 203 controllable heating elements per inch, the print resolution may be expressed as 203 dots per inch (dpi). The print resolution determines the physical, or printed, size of each pixel of a bitmap printed to the media by the printhead 224. The print resolution may be stored as a preconfigured value in the memory 204, such as a setting in an application 232, or in a register or other component of the printhead 224 itself. In an embodiment, the printer may determine a product identifier of the printhead, such as a part number or printhead type, and query a local or remote database to determine the print resolution.

At block 310, the printer 108 is configured to obtain media data for use in generating dimensioning media. The media data can include, for example, a media type loaded into the media handler 220, a size of media to be printed, a stock keeping unit or part number for the media, a media description, label sensing information such as gap sensing or black bar sensing, preprint information for the media or for a GDA preprinted on the media prior to generating the dimensioning media, and the like. The media handler 220 may be configured to handle only a single type of media (e.g. labels having a width of 4 inches and a height of 2 inches), in which case the media type can be preconfigured (e.g. in the memory 204 or the printhead 224). In some examples, however, the media handler 220 can accommodate more than one type of media (e.g. labels of different sizes, materials, or construction). The printer 108, in such embodiments, can be configured to detect the currently loaded media at block 310. The media data obtained at block 310 can also indicate whether the media includes elements such as embedded RFID inlays, preprinted graphics, magnetic stripes, print alignment marks, certain materials, shapes, sizes, or constructions. Media data could be obtained from an input device 208, or via the communications interface 216. In an embodiment, media data could be obtained from an RFID device associated with the media via the RFID encoder 228. In an embodiment, media data could be obtained via the communications interface 216 from received printing instructions, such as Zebra Programming Language, XML, or a printer control language (PCL). In an embodiment, the printer could obtain media data from the media handler 220 as a result of autocalibration comprising sensing a size of media to be printed. In an embodiment, the printer could obtain media data from a sensor associated with the printhead 224. In some embodiments, a particular type of media is assumed with regard to printing operations so that obtaining media data by the printer is unnecessary and step 310 may be omitted.

At block 313, the printer is configured to obtain format data defining formatting characteristics of the dimensioning media to be generated. The format data specifies a layout for the dimensioning media, and may include parameters setting the type of indicia (e.g. barcodes, graphics, lines, text) or other elements (e.g. RFID devices, magnetic stripes) to be generated, and the position of each element or indicium (when more than one indicium are required by the format) on the dimensioning media. In certain embodiments format data may specify a wide range of element or indicium characteristics such as barcode or symbology type, an orientation of the barcode, a width in dots of a narrow bar, a barcode print ratio (the relative width of a wide bar to a narrow bar in the printed representation), a barcode height in dots, a magnification factor, the presence and relative position of a text interpretation line with a barcode, the use of a check digit, a character set or mode, a security level, an error correction level, a menu symbol indicator, an application identifier, a symbol count or total, a matrix width, a matrix height, a cell width, a cell height, a cell character capacity, a guard bar dimension, a finder pattern, a message priority, start or stop characters, row or column instructions for two-dimensional barcodes, a number of colors, specified inks, halftone patterns, or a palette of colors for a color barcode, and the like.

The format data may also include predetermined information for application to the dimensioning media, such as a graphic, border definitions, sequences of numbers, predefined data such as a return address or shipper ID, and the like. For example, the format data associated with generating dimensioning media for an item may be determined according to an appropriate printer control language, such as the ZPL II Programming Guide, the contents of which is incorporated herein by reference. The format data, in further examples, can also specify one or more indicia or other elements of the dimensioning media to be employed as graphical dimensioning aid(s) and machine-readable data object(s) encoding physical size of the graphical dimensioning aid(s). In some embodiments, the format data may specify a preprinted indicia or element to be employed as a GDA. In some embodiments, format data may be stored in memory 204 of the printer or received via the communication interface 216.

At block 315, the printer 108 is configured to receive print data defining information to be applied to the media identified at block 310, according to the format data obtained at block 313. The print data can therefore include text strings such as product stock keeping unit (SKU) identifiers, product names or codes, serial numbers, brand identifiers, model numbers, compliance data, price information, transaction identifiers, transaction descriptive information, address of origin and/or destination, contact names and numbers, time, date, and the like. The print data 315 can also include data defining graphics (e.g. logos, geometric shapes, pictures of products or the like). In some embodiments, print data may be received via the communication interface 216, from the input device 208, or from an RFID encoder 228.

In some embodiments, the format data and the print data obtained at blocks 313 and 315 are received at the printer 108 in a command to generate dimensioning media. The command can be received via the input device 208, from another computing device (not shown) via the communications interface 266 or the like. The command includes at least a command to generate dimensioning media (e.g. one or more labels) bearing the graphical dimensioning aid and encoding the physical size of the graphical dimensioning aid in a machine-readable data object. In some embodiments, the format data and the print data need not be received in a single command. In further embodiments, the performance of blocks 313 and 315 need not follow the performance of blocks 305 and 310. That is, the printer 108 can obtain (e.g. via receipt of one or more commands from another computing device, or via retrieval of the format and print data from the memory 204) the format data and print data before determining the print resolution at block 305 and/or obtaining the media data at block 310. More generally, the order in which the print resolution is determined at block 305, the media data is obtained at block 310, the format data is obtained at block 313, and the print data is obtained at block 315, need not be as shown in FIG. 3. In other words, blocks 305-315 can be re-arranged, or performed simultaneously rather than sequentially as shown in FIG. 3.

In the present example performance of method 300, the print resolution is determined at block 305 as being 203 dpi as noted above. Further, in the present example, the media handler 220 contains a roll of labels, each label having a height (i.e. a size parallel to the direction of travel of the labels past the printhead 224, and perpendicular to the array of heating elements of the printhead 224) of 0.6 inches and a width (i.e. a size parallel to the array of heating elements of the printhead 224) of two inches. At block 310 the printer 108 is therefore configured to obtain the above-noted label sizes.

Further, in the present example performance of method 300, the printer 108 performs blocks 313 and 315 via the receipt of a command including an identifier corresponding to the package 104-1, in the form of the text string "APPLES". As will be apparent, a wide variety of other identifiers may also be employed. The command also includes a label format specification (i.e. format data obtained at block 313), indicating that the dimensioning media to be generated includes a single label containing a barcode positioned 50 dots from the left edge of the label and encoding both the above identifier and a physical size of the barcode itself. That is, the barcode is employed as the graphical dimensioning aid, and the barcode is also employed as the machine-readable data object encoding the physical size of that barcode. In such an embodiment, the dimensioning media or other item is marked with a MRDO comprising data encoding the physical size of that MRDO. In the present example, a Code 39 barcode will be employed for the purpose of illustration, but it will be understood that a wide variety of barcodes, including both one-dimensional (e.g. Code 39, Code128, UPC, Postal Code and the like) two-dimensional (e.g. QRCode, DataMatrix, PDF417 and the like) color codes (Ultracode, HCCB and the like) or combinations thereof can also be employed.

At block 317, the printer 108 is configured to determine or otherwise obtain, based on the data obtained at blocks 305-315, boundary parameters for one or more of the label as whole, the graphical dimensioning aid, and the machine-readable data object encoding the physical size. In general, the boundary parameters define a set of acceptable values for one or more indicia of the dimensioning media.

The printer 108 can also be configured, at block 317, to set one or more configuration parameters for one or more barcodes. In the present example, in which the dimensioning media to be generated includes a single label bearing a barcode that encodes both the identifier "APPLES" and a physical size of the barcode itself, the printer 108 can be configured to select, at block 317, one or more parameters for the generation of the barcode. Such parameters vary depending on the characteristics of the barcode. For example, in the case of the Code 39 barcode to be generated in this example performance of the method 300, the configuration parameters can include a barcode module width (i.e. the width of the narrowest bar of the barcode), for example in dots, thousandths of an inch, or the like. The parameters can also include a ratio of the width of a wide bar to the width of a narrow bar of the barcode. Other configuration parameters will also occur to those skilled in the art (e.g. the width of inter-character spaces in the barcode, typically expressed in dots, and the height of the barcode, also typically expressed in dots). In some examples, the configuration parameters can be contained in the command containing the format data and print data received at blocks 313 and 315 and stored in the memory 204 following receipt, and therefore obtaining the parameters at block 317 includes retrieving the parameters from the memory 204. In the current example, format data may specify that the barcode is preferably a Code 39 symbology printed in a normal orientation 50 dots from the left edge of the label with a Mod-43 check digit 80 dots height with a print interpretation line with a print ratio of 3.0:1. Boundary parameters for the barcode may define a maximum printed length for the barcode indicia of 1.67 inches so it does not print past the right edge of the label and a minimum print ratio of 2.0:1 to maintain scannability. The initial configuration parameter for print ratio would thus be 3.0:1.

At block 320, the printer 108 is configured to determine a physical size of the graphical dimensioning aid, based on the print resolution from block 305, the media data from block 310, the format data from block 313 and/or the print data from block 315. In the present example performance of the method 300, it is assumed that the graphical dimensioning aid is a barcode encoding the package identifier (e.g. "APPLES"), and that the machine-readable data object encoding the physical size of the barcode's height is the barcode itself. The barcode therefore encodes both the identifier "APPLES" and its own height. The identifier and the physical size can be distinguished within the encoded data by various mechanisms. For example, one or more application identifiers can be employed to indicate the nature of the values encoded in the barcode. In the present example, the application identifier "$/" will be employed to separate the package identifier from the physical size. A wide variety of other application identifiers may also be employed, however, including identifiers with fewer than two characters or with more than two characters, identifiers comprised of digits or alpha numerics, and identifiers enclosed within brackets or other predefined characters.

Figure 4A:
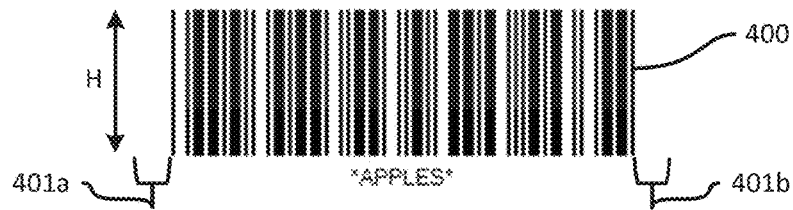
FIGS. 4A-4D illustrate example barcodes generated during the performance of the method of FIG. 3.

The printer 108 can be configured to perform block 320 by rendering the barcode (i.e. generating a bitmap comprising the barcode) according to the configuration parameters from block 317, and determining a number of pixels that, together with the print resolution, define the height of the barcode. The above-mentioned rendering process is described in greater detail below in connection with block 335. Turning to FIG. 4A, an initial barcode 400 is illustrated, encoding the string "APPLES". As will be understood by those skilled in the art, the barcode 400 encodes the string "APPLES" between a pair of quiet zones 401a and 401b, in which no bars, text, graphics or the like appear. The image capture system 222, or any other suitable barcode capture mechanism, is configured to identify the beginning and end of the encoded data of the barcode 400 by the quiet zones 401. The printed height "H" of the barcode 400 is determined based on the number of pixels defining the height of the barcode and on the print resolution. For instance, the configuration parameters selected at block 315 may specify a height of 80 dots for each bar of the barcode 400. The bitmap depicting the barcode 400 therefore has a height of 80 pixels. At a print resolution of 203 dpi, the physical size of the 80-pixel height of the barcode 400 is about 0.394 inches, or 394 thousandths of an inch (mils).

In other examples, the printer 108 is configured to perform block 320 without rendering the bitmap. In the case of a Code 39 barcode, for example, the physical size (including the height) of the barcode can be determined algorithmically, without rendering bitmap data. As is evident from the discussion above, when the height in dots of the barcode 400 is specified in advance, the printed height can be determined without rendering by dividing the height in dots by the print resolution in dots per inch.

At block 325, the printer 108 is configured to determine whether the above-mentioned boundary parameters are satisfied. In the present example, a boundary parameter specifies a maximum length for the barcode 400. This length must be carefully defined for printing, as well as for effective use as both a graphical dimensioning aid and as a machine-readable data object. The barcode length of a linear barcode may describe a first quiet zone followed by a series of wide and narrow spaced bars followed by a second quiet zone. In the present example, a series of black wide and narrow bars separated by white spaces of various widths define the barcode symbol which encodes data such as a start character, item data, check digit, packaging information, a stop character, and such. The barcode also includes quiet zones on each end of the barcode that are necessary for reliable decoding by a scanner or similar barcode decoding system. In the present example, both the barcode symbol and the quiet zones are needed for reliable operation as a machine-readable data object. Printing this barcode on a white direct thermal label would entail heating printhead elements to image thermochromic dyes coated on the label to print the black bars, and not heating printhead elements associated with the spaces and quiet zones in order to leave those areas white. A dimensioning system capturing an image of the barcode could differentiate the contrast change between the outermost bars of the barcode symbol and the adjacent quiet zones, but may be unable to differentiate a contrast change between the outermost region of the quiet zones and the adjacent unprinted white direct thermal label. In the present example, the length of the barcode symbol sans the quiet zones would be an appropriate physical size of the graphical dimensioning aid. In the current example, each bar has a height which is the barcode height; this would also be an appropriate physical size of the GDA. In an embodiment where this barcode is printed on a black thermal transfer label using a white thermal transfer ribbon, printhead elements associated with the spaces and quiet zones would be heated to transfer white ink from the ribbon to the label while printhead elements associated with the black bars would not be heated to leave those areas black. In such an embodiment, the dimensioning system may be able to differentiate a contrast change between the outermost region of the quiet zones and the adjacent unprinted black thermal transfer label, so either the entire barcode length or just the length of the barcode symbol would be an appropriate physical size of the graphical dimensioning aid, as would be the barcode height. In the present example, the maximum barcode symbol length, given that the barcode 400 is to be printed on a white two-inch wide label, may be set to the width of the label (e.g. two inches) subtracted by a predetermined quiet zone width. The quiet zone width may be equivalent to a multiple (e.g. ten times) of the barcode module width noted above. For example, a barcode module width of two dots obtained at block 317 yields a quiet zone on either side of the barcode 400 with a width of 20 dots (i.e. 0.0985 inches at a print resolution of 203 dpi). Thus, the boundary parameter for the barcode symbol length of the barcode 400 is about 1.8 inches. There is no requirement that the dimension subject to the boundary parameter when printing be the same dimension used to determine the physical size of the graphical dimensioning aid which is encoded into the MRDO. In practice, it is preferred that the physical size encoded by the printer correspond with the contrasted region of the GDA measured by the dimensioning system; this could be accomplished by standard, fiat, agreement between two parties, by utilizing defined application identifier codes, or the such.

Figure 4B:

The evaluation at block 325 can be performed by rendering a barcode including both the package identifier and the physical size determined at block 320. In other examples, as noted above, the evaluation at block 325 is made algorithmically, prior to rendering the bitmap defining the barcode. Turning to FIG. 4B, an updated barcode 404 is illustrated, encoding both the string "APPLES" and the height 394 (mils), separated by the application identifier "$/". At block 325 the printer 108 is configured to determine the printed length L–1 of the barcode 404, e.g. by identifying a number of pixels that define the barcode symbol length and dividing that number by the print resolution. Alternatively, as discussed above, the length of the barcode can be determined algorithmically based on the number of encoded characters and the configuration parameters from block 315. The barcode symbol length of the barcode 404 in the present example is about 2037 mils (assuming a barcode module width of two dots, a wide-to-narrow ratio of 3, and inter-character spacing of two dots). The determination at block 325 is therefore negative in the present example, as the length of 2037 mils exceeds the above-mentioned boundary parameter of 1.8 inches (1800 mils).

Returning to FIG. 3, following a negative determination at block 325, the printer 108 proceeds to block 330 to update one or more configuration parameters (which may also be referred to as variables) for the machine-readable representation (in this example, the barcode 404). In particular, to reduce the length of the barcode 404, one or more of the barcode module width, inter-character spacing, and wide-to-narrow ratios can be decreased. In the present example performance of the method 300, the wide-to-narrow ratio is reduced from 3.0:1 to 2.0:1, and block 325 is repeated. In some embodiments, the printer 108 may return to block 320 rather than block 325. For example, if one of the boundary parameters specifies a height for the barcode, and at block 325 it is determined that the resulting barcode exceeds the boundary height, the height may be adjusted at block 330, which necessitates repetition of block 320 to obtain the updated printed height for encoding into the barcode.

Figure 4C:
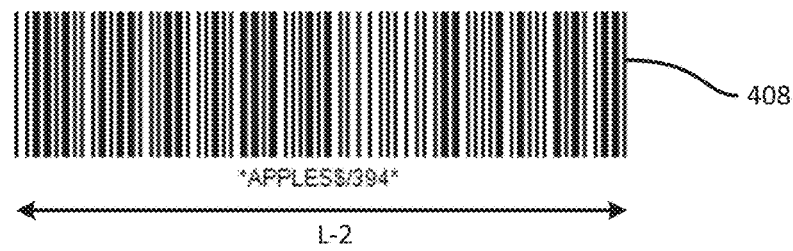

Referring to FIG. 4C, an updated barcode 408 is illustrated, encoding the same data as in FIG. 4B but having a reduced length L–2 as a result of the reduction in the wide-to-narrow ratio from 3.0:1 to 2.0:1. In particular, the length L–2 is about 1653 mils in the present example. The determination at block 325 is therefore affirmative, and performance of the method 300 proceeds to block 335.

At block 335, the printer 108 is configured to render the graphical dimensioning aid and generate the machine-readable representation of the physical size determined at block 320. As noted earlier, the performance of block 335 may be employed, in some embodiments, for either or both of the determinations at blocks 320 and 325. That is, the performance of block 335 can precede block 320, or can precede block 325 in such embodiments. In the present example, the performance of block 335 includes the rendering of the barcode 408 shown in FIG. 4C, which also constitutes generation of the machine-readable representation of the physical size. More generally, at block 335 the printer 108 is typically configured to render a single bitmap for printing to the media, including the graphical dimensioning aid and the machine-readable representation. In the present example, therefore, the rendering at block 335 can include rendering a bitmap appropriate to the dimensions of the labels (e.g. 0.6 inches by two inches, in this example), and containing the barcode 408. In some embodiments, the physical size of the graphic dimensioning aid need not be determined as discussed above, but can instead be obtained from any suitable data source, having been previously determined. In such examples, in other words, the method 300 can consist simply of blocks 335 and 340.

Figure 4D:
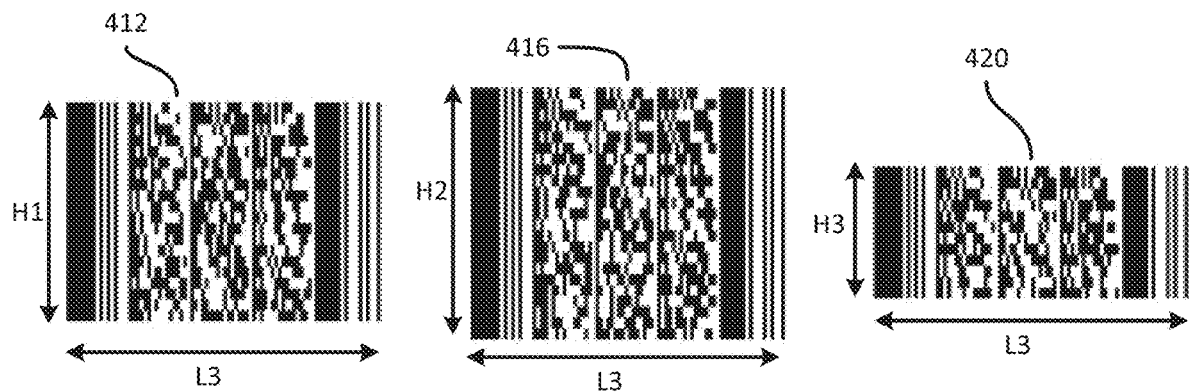

Before proceeding with the remainder of the method 300, another example of the performance of blocks 320-330 is illustrated in FIG. 4D, employing a PDF417 barcode rather than the Code39 barcode shown in FIGS. 4A-4C. FIG. 4D illustrates an initial barcode 412 having a length L-3 and a height H1 and encoding the string "APPLES". A barcode 416 encodes both the string "APPLES" and the physical size of the length L-3 (e.g. 950 mils), for example as the string "APPLES$/950". As is apparent in FIG. 4D, although the length L-3 of the barcode 416 remains unchanged, the barcode 416 has a greater height H2 than the barcode 412.

The barcodes 412 and 416 employ the same error correction configuration parameter (e.g. an error correction level 3, indicating that 16 error correction codes are employed). When the height H2 of the barcode 416 exceeds a boundary parameter, the printer 108 may be configured to select a different error correction configuration parameter (e.g. reducing the number of error correction codes employed) and to generate an updated barcode 420, having the same length L-3 as the codes 412 and 416, and encoding the same string as the code 416, but having a reduced height H3 as a result of the altered error correction setting.

At block 340, the printer 108 is configured to generate dimensioning media bearing the graphic and the machine-readable representation. That is, the printer 108 is configured to control the printhead 224 to apply the bitmap rendered at block 335 to a label and eject the printed label at an outlet of the printer 108, for application to the package 104. In some embodiments, block 340 may include both encoding the physical size into a RFID device in a label and printing the rendered bitmap to the label.

As will be apparent from the example performance of method 300 described above, the act of encoding the printed height H of the barcode 400 within the barcode 404 does not alter the height H. In other words, in the example above the printed dimension is independent of the machine-readable representation of the physical size. In some examples, however, the selected graphical dimensioning aid has a printed dimension that is not independent of the machine-readable representation. One such example is the use of a Code 39 barcode to encode a package identifier (e.g. the string "APPLES" as used above), and also the barcode's own barcode symbol length. That is, the physical size of the graphical dimensioning aid is the barcode symbol length, and the machine-readable data object is the barcode itself. The barcode symbol length of a Code 39 barcode (or the length and/or height of various other barcode symbologies) depends in part on the number of characters encoded into the barcode. In this case, encoding the length within the barcode may change that very length.

Figure 5:
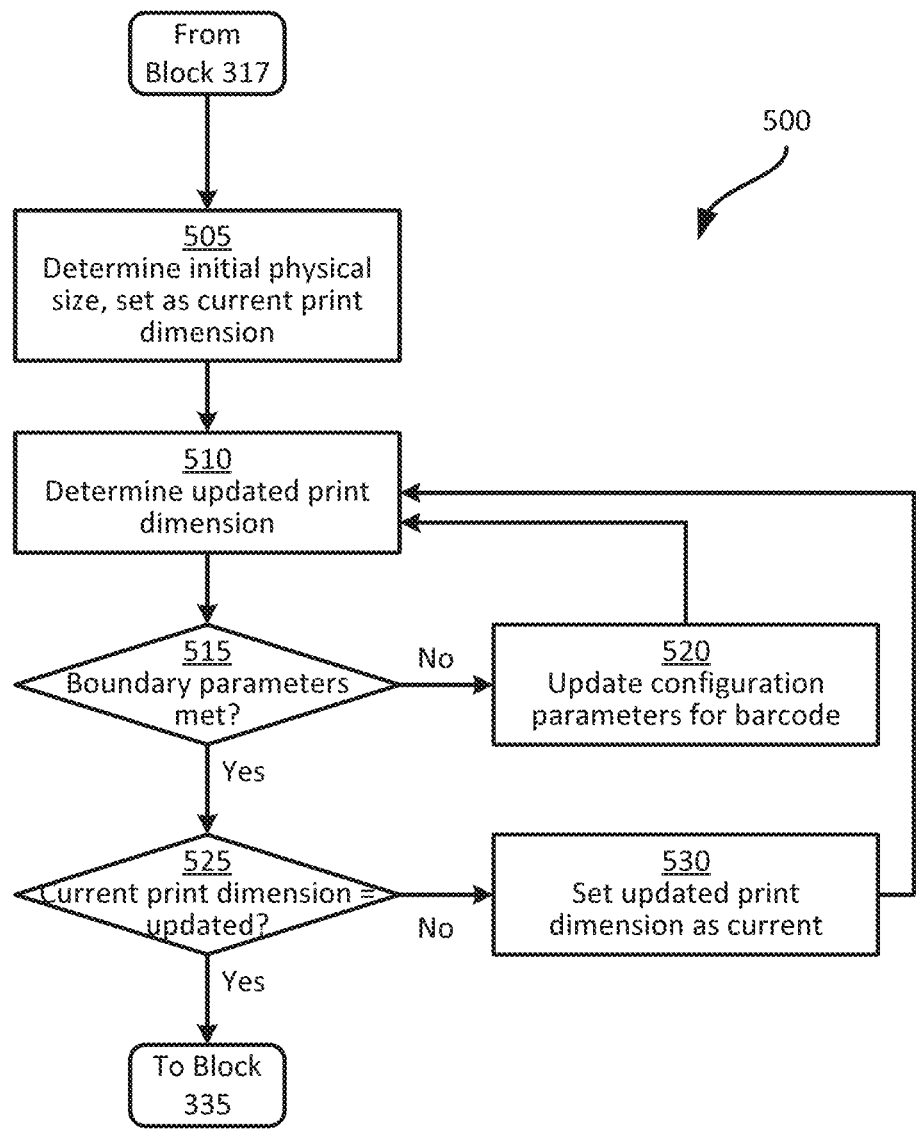
FIG. 5 is a flowchart of a method for iteratively determining a physical size of a graphical dimensioning aid for use in the method of FIG. 3.

In such examples, the printer 108 is configured to implement additional functionality, to perform an iterative process configured to identify a physical size that remains accurate when encoded in the barcode described by the physical size. Specifically, FIG. 5 illustrates a method 500 of iteratively determining physical size of a graphical dimensioning aid, when the physical size is dependent on its machine-readable representation. In the example performance of method 500 discussed below, the graphical dimensioning aid is a length of a barcode encoding the package identifier "APPLES", and the machine-readable representation of the physical size is the barcode itself.

Figure 6A:
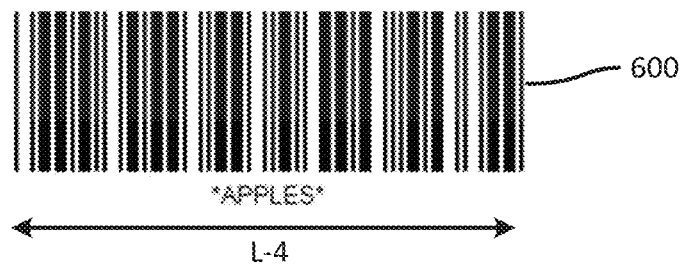
FIGS. 6A-6D illustrate example barcodes generated during the performance of the method of FIG. 5.

The method 500 begins, at block 505, following the performance of block 317 as described above. At block 505, the printer 108 is configured to determine an initial physical size, in the form of a barcode symbol length L-4, of an initial barcode 600 shown in FIG. 6A encoding the package identifier without the physical size, such as only the package identifier, the package identifier with a null or zero physical size, or the package identifier with a default value physical size. The length L-4 may be determined as described above, e.g. via rendering or algorithmically. In the present example, the barcode symbol length of the barcode 600 is 1250 mils (assuming a print resolution of 203 dpi, barcode module width and inter-character spacing of 2 dots, and a wide-to-narrow ratio of 3.0:1). The initial print dimension is set (e.g. as a value stored in the memory 204) as a current print dimension.

Figure 6B:

Returning to FIG. 5, at block 510, the printer 108 is configured to determine an updated print dimension of an updated barcode encoding both the package identifier and the current print dimension. Turning to FIG. 6B, the determination at block 510 in the present example is a determination of the barcode symbol length of an updated barcode 604 encoding the string "APPLES" and the current print dimension (1250 mils), separated by the application identifier "$/". A barcode symbol length L-5 of the barcode 604, determined as discussed above, is 2195 mils.

Returning again to FIG. 5, at block 515 the printer 108 is configured to determine whether boundary parameters are met, and to update configuration parameters at block 520 when the determination is negative, as described above in connection with blocks 325 and 330. In the present example, the length of 2195 mils exceeds the boundary length of 1800 mils noted above, and the determination at block 515 is therefore negative. The printer 108 is configured, at block 520, to reduce the wide-to-narrow ratio for the barcode from 3.0:1 to 2.0:1 (though other adjustments may be employed instead of, or in addition to, the ratio alteration, as noted earlier).

Figure 6C:

FIG. 6C illustrates an updated barcode 608 encoding the same data as the barcode 604, following configuration adjustment at block 520. At block 510, the determination of print dimension is repeated, revealing that the barcode 608 has a barcode symbol length L-6 of 1781 mils, which satisfies the boundary length of 1800 mils. Therefore, the determination at block 515 is affirmative.

At block 525, the printer 108 is configured to determine whether the current print dimension (set at block 505) is equal to the updated print dimension (determined at block 510). As noted above, the updated print dimension is 1781 mils, whereas the current print dimension remains at 1250 mils. The printed dimensions are therefore not equal, and the barcode 608, while satisfying boundary parameters, encodes an incorrect length (i.e. a length that does not accurately reflect the barcode symbol length of the barcode 608).

Figure 6D:

The printer 108 therefore proceeds to block 530 and sets the updated print dimension to the current print dimension. The performance of blocks 510, 515 and 525 are then repeated. In the present example, as seen in FIG. 6D, the length of a barcode 612 encoding the string "APPLES" and the current print dimension (1781 mils) is the same length L–6 as for the barcode 608. At block 525, therefore, the determination is affirmative, indicating that the current print dimension is an accurate determination of the physical size. The printer 108 proceeds from an affirmative determination at block 525 to block 335, to render the barcode 612 and generate dimensioning media. In a preferred embodiment, an integer number of bitmap dot columns for the initial print dimension and a corresponding value for the updated print dimension would be compared in block 525 to determine whether they are equal, where both the first and the outermost dots of the bitmap correspond to features of the graphical dimensioning aid to be marked on the dimensioning media so they may be easily measured by a dimensioning system as explained below. In various embodiments, the comparison may be made based on a number of bitmap dot rows, on a size determination based on a print resolution, on a size determination based on an expected dot gain for a particular printing technology, on a combination of such calculations or other methods. In some embodiments, the overall size of the graphic dimensioning aid (including unprinted areas or quiet zones) may be evaluated to reach the determination. In embodiments, the determination of equality may be subject to a tolerance of the calculation, measurement, printer, media, process, dimensioning system and the like so that two dimensions that are not exactly the same may differ by a sufficiently small amount may still be considered equal for the purposes of this invention.

In some embodiments, the printer 108 is configured to increment a counter following each negative determination at block 325 (a similar counter can be implemented for either or both of blocks 515 and 525). When the counter reaches a predefined threshold, the printer 108 is configured to abort the performance of the method 300 or 500 and generate an error message. In an embodiment, when the configuration parameters are updated by a sufficiently small amount the printer may be configured to abort the performance of the method and generate the error message. In an embodiment, the predefined threshold may be included in received media data 310, format data 313, or print data 315, or may be defined as a result of determining boundary parameters 317.

Figure 7A:
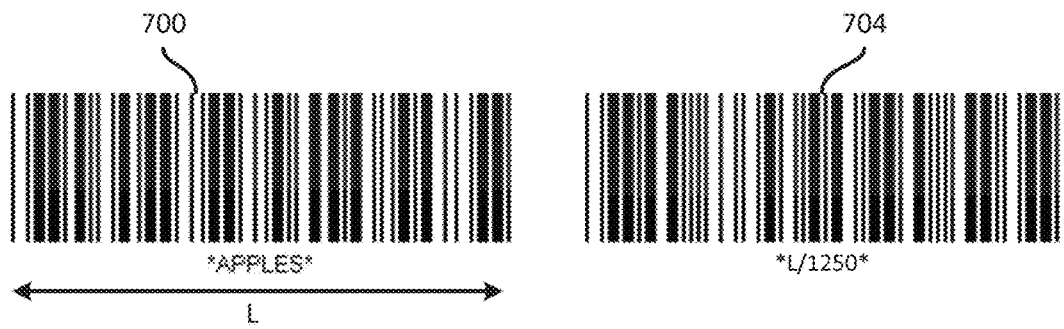
FIGS. 7A-7C illustrate additional examples of graphical dimensioning aids and corresponding machine-readable representations of physical sizes of the graphical dimensioning aids.

Various other examples of graphical dimensioning aids and machine-readable representations of physical sizes are contemplated, in addition to those described above. For example, turning to FIG. 7A, the graphical dimensioning aid is a first barcode 700 (having a barcode symbol length L) encoding the package identifier (e.g. "APPLES"), and the machine-readable data object is a second barcode 704 encoding the barcode symbol length of the first barcode as a physical size of the graphical dimensioning aid. In the present example, the second barcode 704 is also a Code 39 barcode, but the first and second barcodes 700 and 704 need not be the same symbology. For instance, the first barcode could be a linear barcode and the second barcode could be a 2D barcode. The barcodes 700 and 704 can be printed, at block 340, on a single label or package, or on separate labels, or one barcode could be printed on a label and the other barcode marked directly onto the item. It will also be noted in FIG. 7A that another example of an application identifier (the string "L/") is employed to identify the second barcode 704 as encoding the physical dimension.

Figure 7B:

FIG. 7B illustrates a further example, in which the graphical dimensioning aid includes one or more graphics 708 such as a logo, compliance mark, licensed trademark, character glyph (such as (or $), or other graphic. For example, the graphical dimensioning aid can include a lower edge 710 (having a length L) and a left edge 709 (having an height H) of the graphic 708. The machine-readable representation of the physical size L, H, or combination thereof can be encoded in a machine-readable data object such as barcode 712 or an RFID device.

Figure 7C:

FIG. 7C illustrates yet another example, in which the graphical dimensioning aid is the barcode 700 (having a height H). The machine-readable data object is a string of text 716 (e.g. printed on the same label or on a different label than the barcode 700) specifying the height H (394 mils, in the present example) as the physical size of the graphical dimensioning aid.

Figure 8:
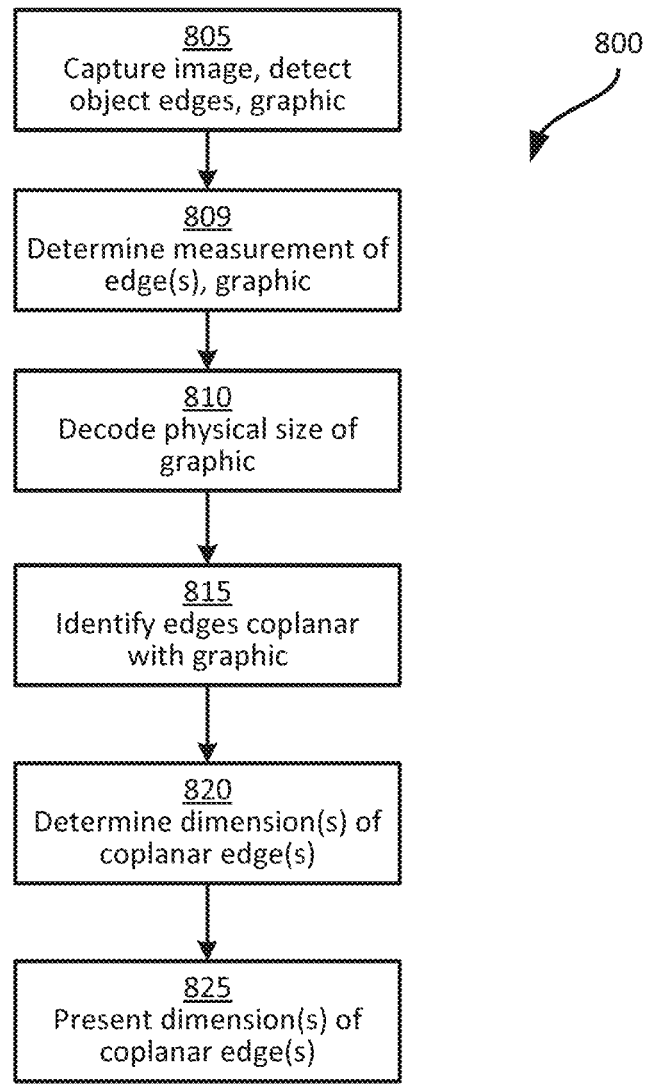
FIG. 8 is a flowchart of a method for dimensioning an item.

Following the generation of dimensioning media via the performance of methods 300 and 500, the dimensioning media may be affixed to a package 104. The dimensioning system 112 is subsequently configured to employ the dimensioning media to determine one or more physical dimensions of the package 104, as discussed in connection with FIG. 8, which depicts a method 800 of dimensioning an item.

At block 805, the dimensioning system 112 is configured to capture an image of the item (e.g. a package 104), for example via control of the image capture system 222. In some embodiments the image capture system 222 is implemented as a system including more than one image sensor. In some embodiments a plurality of images (e.g. one per image sensor, or multiple images at one sensor captured at distinct times, or images captured by a sensor at different frequencies of light) can be captured at block 805. In some embodiments, a plurality of images may be combined into a single captured image. In some embodiments either or both the item 104 and the image capture system 222 may be moving so the combining may be done in such a manner to ensure that the measured length of the GDA and the measured length of the edge from the combined image may be correlated. The system 112 is further configured to detect, as depicted in the captured image, one or more edges of the package 104 and a graphical dimensioning aid.

In an embodiment, the captured image may be a digital image comprising a plurality of pixels arrangeable in rows and columns. In such an embodiment the package 104 is a cardboard box in the shape of a rectangular prism with a barcode shipping label on a front face of the box. The captured image may show three faces of the box, each with a certain general brightness. The pixels representing the three faces may differ somewhat in brightness because the box faces are orthogonal to each other, and thus are oriented at different angles relative to illuminating light sources and to the image capture system 222. Pixels representing various portions of a single face also may vary in brightness due to small differences in angles relative to illuminating sources and the image capture subsystem, color variations, dirt on the package 104 or the image capture system 222, and/or printing on the packaging. Applying an edge detection algorithm to the captured image allows detecting appropriate gradients between areas of the image and associating those areas with an edge. Two or more such edges define the front face of the rectangular prism shaped box. A first front edge, combined with three additional edges, define a second face of the box. A third face of the box may be defined by a second front edge of the box perpendicular to the first front edge, a second edge of the second side perpendicular to both the first and second front edges, and two additional edges. Although in this example the edges of the rectangular prism box are all in a perpendicular arrangement, the two-dimensional captured image is unlikely to have any of the edges appear perpendicular. Edge detection can be performed using any suitable edge detection operation (e.g. by identifying sequences of gradients indicative of changes in color or lighting associated with the edge of an item).

In the current embodiment, an appropriate barcode locating algorithm could also identify the presence of a barcode on a barcode shipping label by detecting differences in brightness resulting from the darkly printed barcode on a white label. The barcode may be associated with a particular face of the box by determining the position or appearance of the detected barcode to the detected edges in the captured image. The barcode may be associated with a particular face of the box if three or more detected edges surround the barcode. In certain embodiments, the graphical dimensioning aid will approximate a rectangle with a height and a width. For instance, a Code 128 barcode may have a height defined as the height of each bar, and a width defined as the total width from the left edge of the leftmost black bar to the right edge of the rightmost black bar. A line constructed through the top of every bar would thus be parallel to a line constructed through the bottom of every bar, but perpendicular to a line constructed through the left edge of the leftmost black bar and perpendicular to a line constructed through the right edge of the rightmost black bar. The four angles created by those four lines would each be 90 degrees. However, the apparent angles in the captured image might differ. If the image was captured from a far distance along a line normal to the center of the GDA, the GDA may appear rectangular. But if the image was captured from a non-orthogonal position along a line parallel to the sides of the barcode but perpendicular to the top of the barcode, the top of the barcode may appear larger than the bottom of the barcode, and angles between the top and sides of the barcode would appear smaller than 90 degrees, while angles between the bottom and sides of the barcode would appear larger than 90 degrees. For other orientations, angles nearer the position at which the image is captured will generally appear larger than angles further from the position at which the image is captured. This characteristic may also be used in dimensioning to associate the GDA with a particular face of the package or to determine the orientation of the GDA relative to the dimensioning system. An appropriate barcode decoding algorithm may decode data from the barcode to determine item information and/or physical size information for the graphical dimension aid barcode. The system 112 can store criteria for identifying a graphical dimensioning aid such as the barcode in the current embodiment. For example, the system 112 can be configured to inspect the image captured at block 805 for one or more types of graphic defined in the memory 254. The types of graphic for which the system 112 is configured to search can include any of those noted above, such as barcode features (e.g. any suitable pattern of a barcode), graphic features (e.g. the logo of FIG. 7B), text features, the antenna of an RFID device, the edge of a label on the carton of the package and the like.

At block 809, the system 112 is configured to determine a measurement of an edge detected in block 805, and to determine a measurement of the graphical dimensioning aid detected in block 805. Measuring edges, graphical dimensioning aids, or other features within the captured image can be performed using any suitable measurement operation, such as calculating the square root of (row difference squared plus column difference squared). At block 810, the system 112 is configured to capture and decode, from a machine-readable data object affixed to the item, a physical size of the graphical dimensioning aid imaged and detected at block 805 and measured at block 809. The above-mentioned criteria can also specify the machine-readable data object(s) corresponding to each graphical dimensioning aid. For example, the system 112 can be configured, having detected the graphical dimensioning aid logo of FIG. 7B, to locate and decode the machine-readable data object barcode 712 in the image(s) captured at block 805. In another example, having detected the graphical dimensioning aid barcode 612 in the image captured at block 805, the system 112 can be configured to decode machine-readable data object barcode 612 to determine the physical size of graphical dimensioning aid barcode 612. In another example, having detected the graphical dimensioning aid barcode 700 in the image(s) captured at block 805, the device 112 can be configured to locate the machine-readable data object text string 716 in the image and apply optical character recognition (OCR) to decode the physical size of graphical dimensioning aid barcode 700. In a further example, at block 810 the system 112 can be configured to identify a compliance format MRDO of a compliance label and select a physical size of a GDA defined by the compliance format corresponding to the graphical dimensioning aid measured in block 809. In a further example, at block 810 the system 112 can be configured to read a MRDO RFID device carried by the item to retrieve a physical size of the graphical dimensioning aid measured in block 809. As explained above, decoding may be performed by a data capture system 228 of the dimensioning system 112, or may be performed by using an application 268 based on an image captured by image capture system 222, or any suitable combination.

At block 815, the dimensioning system 112 is configured to identify a set of the edges detected at block 805 that are substantially coplanar with the graphical dimensioning aid. For example, the dimensioning system 112 can be configured to identify a set of the edges that enclose the graphical dimensioning aid. Referring to FIG. 9, an image 900 of a package 104 is illustrated, as captured by the dimensioning system 112 at block 805. The image 900 also depicts a graphical dimensioning aid 902 which is affixed to the package via a label. In an embodiment, graphical dimensioning aid 902 could be a white label on a dark carton. In an embodiment, graphical dimensioning aid 902 could be a colored border on a label affixed to the carton. In an embodiment, graphical dimensioning aid 902 could be barcode 612 printed on a label affixed to the carton. The physical size of the graphical dimensioning aid 902 is decoded from the machine-readable data object barcode 612, and in the present example corresponds to 1781 mils (see FIG. 6C). In an embodiment, the machine-readable data object could be a RFID device carried by the label or the package. For accurate dimensioning it is desirable that the graphical dimensioning aid detected in block 805 be approximately coplanar with the edges detected in block 805. In some embodiments, the orientation of the MRDO does not matter as long as it may be captured and decoded by the system 112. For some applications, compliance labels have been defined for use between trading partners; in an embodiment the compliance label definition may specify agreed symbologies, predetermined symbols, sizes, or placement of the graphical dimensioning aid. In such an embodiment, a dimensioning system may capture an image of an item and an associated graphical dimensioning aid; analyze the captured image to detect a format, logo, or barcode based on a compliance specification; and determine physical dimensions of the graphical dimensioning aid from memory 254 based on the detection.

The system 112 detects a plurality of edges at block 805 corresponding to the visible edges of the package 104, including edges 904-1, 904-2, 904-3 and 904-4. As shown in FIG. 9, the edges 904-1 to 904-4 enclose the graphical dimensioning aid 902, indicating (based on the assumption that the package is a rectangular prism and the GDA is a label) that the graphical dimensioning aid 902 is coplanar with the edges 904. At block 820, the system 112 is configured to determine a physical dimension of at least one of the edges identified at block 815, based on the physical size of the graphical dimensioning aid 902 (decoded from the barcode 612) as well as on the image measurements from block 809, of both the GDA 902 and the edge 904.

In the present example, as noted above, the physical size of the GDA 902 is 1781 mils. The physical length of the edge 904-1 can therefore be determined by dividing the measured length of the edge 904-1 by the measured length of the GDA 902 then multiplying by the physical size of the GDA 902. For example, if the measured length of the GDA 902 is 800 pixels, and the measured length of the edge 904-1 is 2240 pixels, the physical length of the edge 904-1 is determined by multiplying 1781 mils by 2.8 (i.e. 4.99 inches).

The dimensioning system 112 is further configured, at block 825, to present the physical lengths of the coplanar edges determined at block 820. For example, the dimensions can be presented via the output device 262. In some examples, at block 825 the dimensioning system 112 is further configured to employ the physical dimension(s) determined at block 820, as well as the physical size of the GDA 902, in further dimensioning operations based on any combination of the image 900, additional images, lidar data depicting the package 104, ultrasound data representing the package 104, and the like. For example, the dimensions determined at block 820 can be employed as calibration values in such dimensioning operations, used to determine the distance from a sensor to the GDA, or reported to data analytics software. Certain embodiments of this invention provide methods for a dimensioning system to determine the dimension of a graphical dimensioning aid where the distance between the dimensioning system 112 and the graphical dimensioning aid 110 has not been predetermined by the dimensioning system. In some embodiments, the dimensions determined at block 820 may be used with other data to dimension the package; such other data may be determined by the dimensioning system 112, from other sources, or from a combination of sources. The dimensions determined at block 820 for a first package in a container or on a pallet may be used by a dimensioning system to dimension a second package in the container even if the second package does not carry the GDA by dividing a measured length of an edge of the second package by a measured length of the edge 904 then multiplying by the physical dimension determined at block 820.

Variations to the above systems and methods are contemplated. For example, dimensioning media can be applied to a collection of items, such as a pallet bearing multiple packages 104, instead of or in addition to being applied to individual items. For example, individual packages 104 can be palletized, and an additional dimensioning label can be applied to a pallet overwrap, such that an image of the pallet depicts a plurality of graphical dimensioning aids and associated physical sizes. The dimensions of the pallet may then be determined based on any one of the graphical dimensioning aids. For packages of certain shapes or for flexible packaging, the machine-readable data object (such as a compliance label format, RFID device, or a barcode) may include both the size of the graphical dimensioning aid and an indication of the packaging shape or type. For example, dimensioning media indicating that the graphical dimensioning aid is 1781 mils in length and is also carried lengthwise by a cylindrical package could be used to determine the overall length of the package by dividing the measured length of the cylinder by the measured length of the GDA then multiplying by 1781 mils: the physical size of the GDA. The indication of the packaging may indicate "non-rectangular prism" to inform the dimensioning system not to use standard rectangular prism algorithms to dimension the item, it may more specifically indicate "tube" or "5 sided box" to inform the dimensioning system to use a different algorithm to dimension the item, or it may indicate a packaging SKU of predefined dimensions or a unique serialized identifier for the particular item that may be used by the dimensioning system to determine the physical size of the packaging by referencing data stored in memory. The indication of the packaging may also indicate other packaging information useful to a dimensioning system, such as the shape of the package, the color of particular marks, the physical size of package attributes other than printed mark, package dimensions, package type, weight, or parcel number.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including either software or firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of dimensioning an item, comprising:
at a dimensioning system, capturing an image of the item and a graphical dimensioning aid carried by the item;
detecting an edge of the item within the captured image;
determining a measurement of the edge;
detecting the graphical dimensioning aid within the captured image;
determining a measurement of the graphical dimensioning aid;
decoding a physical size of the graphical dimensioning aid from a machine-readable data object carried by the item;
dimensioning the edge based on the measurement of the edge, the measurement of the graphical dimensioning aid, and the physical size.

2. The method of claim 1, wherein the machine-readable data object comprises at least one of a barcode, text and a graphic.

3. The method of claim 1, wherein the graphical dimensioning aid comprises a compliance label; and
wherein decoding the physical size of the graphical dimensioning aid from the machine-readable data object comprises identifying the compliance format and determining the physical size of the graphical dimensioning aid based on the identified compliance format.

4. The method of claim 1, wherein the graphical dimensioning aid comprises a label; and
wherein detecting the graphical dimensioning aid within the captured image further comprises detecting a color of the label contrasting with a color of the item.

5. The method of claim 1, wherein the machine-readable data object is the graphical dimensioning aid.

6. The method of claim 1, wherein the machine-readable data object includes an RFID device carried by the item, and wherein decoding the physical size includes reading the RFID tag.

7. Dimensioning media for use in dimensioning an item, the dimensioning media comprising:
a printable substrate carrying a machine-readable data object, the printable substrate configured to be attached to the item such that the machine-readable data object is readable by a reader;
a graphical dimensioning aid printed on the substrate;
wherein a physical size of the graphical dimensioning aid is encoded in the machine-readable data object.

8. The dimensioning media of claim 7, wherein the machine-readable data object is a radio frequency identification (RFID) device comprising memory; and
wherein the physical size of the graphical dimensioning aid is encoded in the memory.

9. The dimensioning media of claim 8, wherein the RFID device further comprises an antenna; and wherein the graphical dimensioning aid is the antenna.

10. The dimensioning media of claim 7, further comprising a predetermined symbol; wherein the graphical dimensioning aid is an element of the predetermined symbol.

11. The dimensioning media of claim 7, wherein the graphical dimensioning aid is an element of the machine-readable data object.

12. The dimensioning media of claim 7, wherein the graphical dimensioning aid comprises one of a barcode, text, a graphic, and a compliance label formatted according to a compliance format.

13. A media processing system adapted to generate dimensioning assist information for an item comprising:
at least one memory configured to store an application, the application configured to cause the media processing system to:
obtain data associated with a graphical dimensioning aid associated with the item;
determine dimensioning assist information comprising a physical size of the graphical dimension aid; and
encode the dimensioning assist information into a machine-readable data object and a printhead configured to print the machine-readable data object on dimensioning media configured to be attached to an item to be read by a reader.

14. The media processing system of claim 13 further comprising a RFID encoder configured to write the machine-readable data object to a RFID device.

15. An apparatus comprising:
a processor configured to receive data associated with a graphical dimensioning aid and generate a printable representation of a machine-readable data object encoding a physical size of the graphical dimensioning aid based on the received data; and
a printhead configured to print at least a portion of dimensioning media in accordance with the printable representation on a printable substrate carrying the machine-readable data object and configured to be attached to an item such that the machine-readable data object is readable by a reader.

16. A non-transitory computer-readable medium having computer readable program code stored thereon, the program code being configured to, when executed, cause an apparatus to at least obtain data associated with a physical size of a graphical dimensioning aid associated with an item and generate dimensioning assist information by encoding the data into a machine-readable data object for the item.

17. A computer program product comprising at least one computer-readable storage medium having executable computer-readable program code instructions stored thein, the computer-readable program code instructions configured to:
obtain data associated with a physical size of a graphical dimensioning aid associated with an item and generate dimensioning assist information by encoding the data into a machine-readable data object for the item.

18. A dimensioning system configured to:
capture an image of an item and a graphical dimensioning aid associated with the item;
detect an edge of the item within the captured image;
determine a measurement of the edge;
detect the graphical dimensioning aid within the captured image;
determine a measurement of the graphical dimensioning aid;
detect a machine-readable data object within the captured image;
decode a physical size of the graphical dimension aid from the machine-readable data object; and
generate a dimension of the item based on the measurement of the edge, the measurement of the graphical dimensioning aid, and the physical size.

19. A non-transitory computer-readable medium having computer readable program code stored thereon, the program code being configured to, when executed, cause an apparatus to at least:
analyze a captured image of an item and a graphical dimensioning aid associated with the item;
detect an edge of the item within the captured image;
determine a measurement of the edge;
detect the graphical dimensioning aid within the captured image;
determine a measurement of the graphical dimensioning aid;
detect a machine-readable data object within the captured image;
decode a physical size of the graphical dimension aid from the machine-readable data object; and
generate a dimension of the item based on the measurement of the edge, the measurement of the graphical dimensioning aid, and the physical size.

20. A computer program product comprising at least one computer-readable storage medium having executable computer-readable program code instructions stored thein, the computer-readable program code instructions configured to:
analyze a captured image of an item and a graphical dimensioning aid associated with the item;
detect an edge of the item within the captured image;
determine a measurement of the edge;
detect the graphical dimensioning aid within the captured image;
determine a measurement of the graphical dimensioning aid;
detect a machine-readable data object within the captured image;
decode a physical size of the graphical dimension aid from the machine-readable data object; and
generate a dimension of the item based on the measurement of the edge, the measurement of the graphical dimensioning aid, and the physical size.

* * * * *